March 17, 1959  L. E. KIBLER ET AL  2,877,816
MUSHROOM TRIMMING MACHINE
Filed Dec. 11, 1956  2 Sheets-Sheet 1
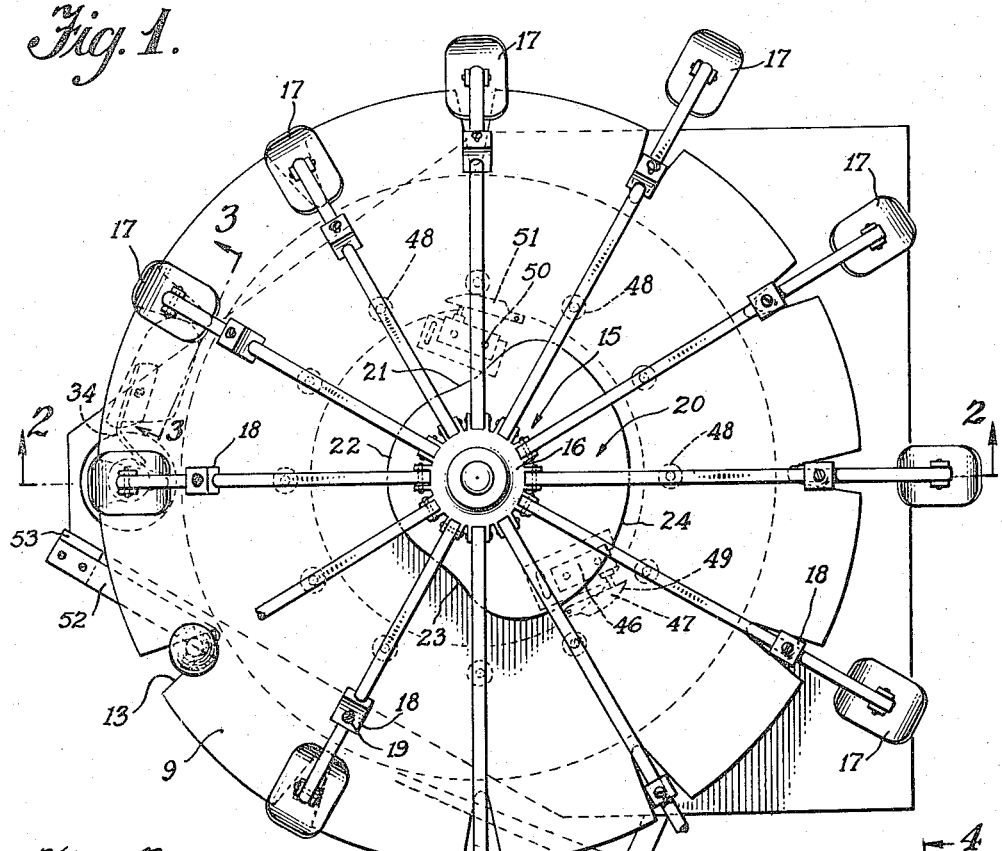
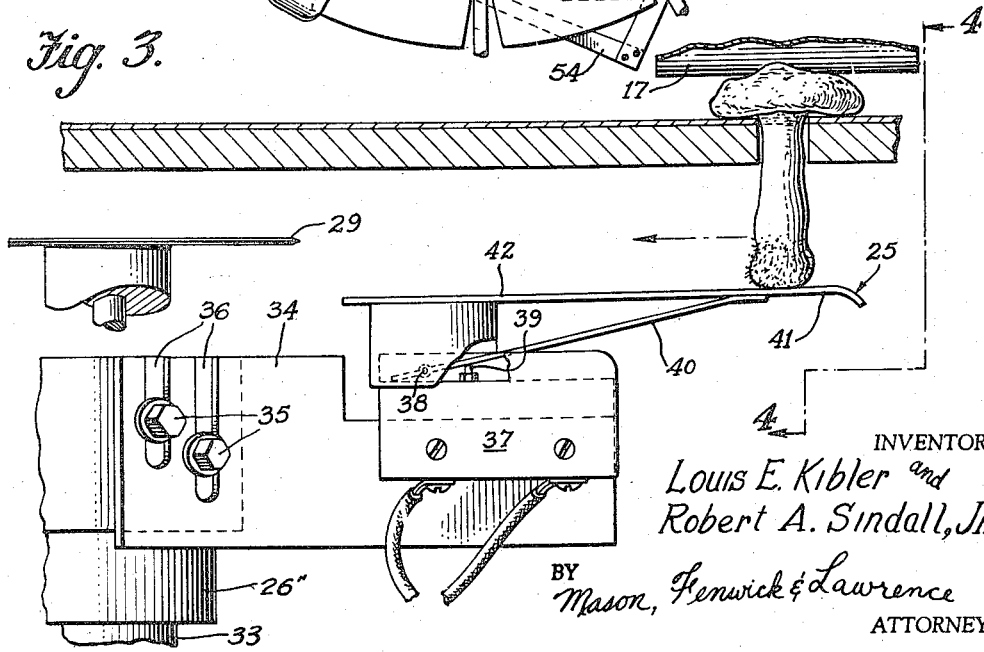
INVENTORS
Louis E. Kibler and
Robert A. Sindall, Jr.
BY Mason, Fenwick & Lawrence
ATTORNEYS March 17, 1959 L. E. KIBLER ET AL 2,877,816
MUSHROOM TRIMMING MACHINE
Filed Dec. 11, 1956 2 Sheets-Sheet 2

INVENTORS
Louis E. Kibler and
Robert A. Sindall, Jr.
BY Mason, Fenwick & Lawrence
ATTORNEYS

United States Patent Office 2,877,816
Patented Mar. 17, 1959

2,877,816

MUSHROOM TRIMMING MACHINE

Louis E. Kibler and Robert A. Sindall, Jr., Baltimore, Md., assignors to A. K. Robins & Company, Inc., Baltimore, Md., a corporation of Maryland Application December 11, 1956, Serial No. 627,590

12 Claims. (Cl. 146—81)

This invention relates to improvements in machines for cutting elongated articles, or commodities, into several pieces, and particularly to such machines wherein the article length between cuts may vary from piece to piece during machine operation. A machine of this general nature is shown in United States Patent No. 2,621,692, issued to Joe R. Urschel and Lewis E. Walton, December 16, 1952.

In the preparation of mushrooms, the top, or button is cut from the stem and the root end of the stem is also cut off. The length which it is necessary to cut off at the root end is substantially the same for all mushrooms, but the stem length varies considerably. If all edible portions of the mushroom are to be salvaged for use, the distance between the two cuts must be varied in accordance with the overall length of each mushroom stem. In an automatic machine, this requires adjustment of the vertical displacement between the button knife and root knife for each mushroom as each is presented for cutting. The Urschel et al. patent, mentioned above, discloses a machine which accomplishes this by providing a vertically movable root knife which has its cutting position determined by a guide plate which is depressed by the root end of the mushroom sliding over it. This machine has been highly successful in commercial use, but it will be obvious that some breakage of stems must result from actual depression of the guide plate and knife by contact of the mushroom.

The object of the present invention is to provide a machine of the type indicated having improved means for controlling the vertical displacement of the button and root knives.

A more specific object is the provision of such improved knife-positioning means which is electrically operated and does not depend upon the mushroom as the actual moving instrumentality.

Another object of the invention is to provide improved means for holding the mushrooms in place upon the machine during the knife-positioning and cutting operation to more accurately control the proper cutting position of the root knife.

Still another object is the provision of holding means which will be maintained in an out of the way position during loading of the machine.

Other objects of the invention will become apparent from the following description of one practical embodiment thereof, when taken in conjunction with the drawings which accompany, and form part of, this specification.

In the drawings:

Figure 1 is a top plan view of a mushroom trimming machine constructed in accordance with the present invention;

Figure 3 is an enlarged sectional view, taken on the line 3—3 of Figure 1 showing the mushroom carrying turret, movable root knife, and root knife position-controlling trigger;

Figure 2:
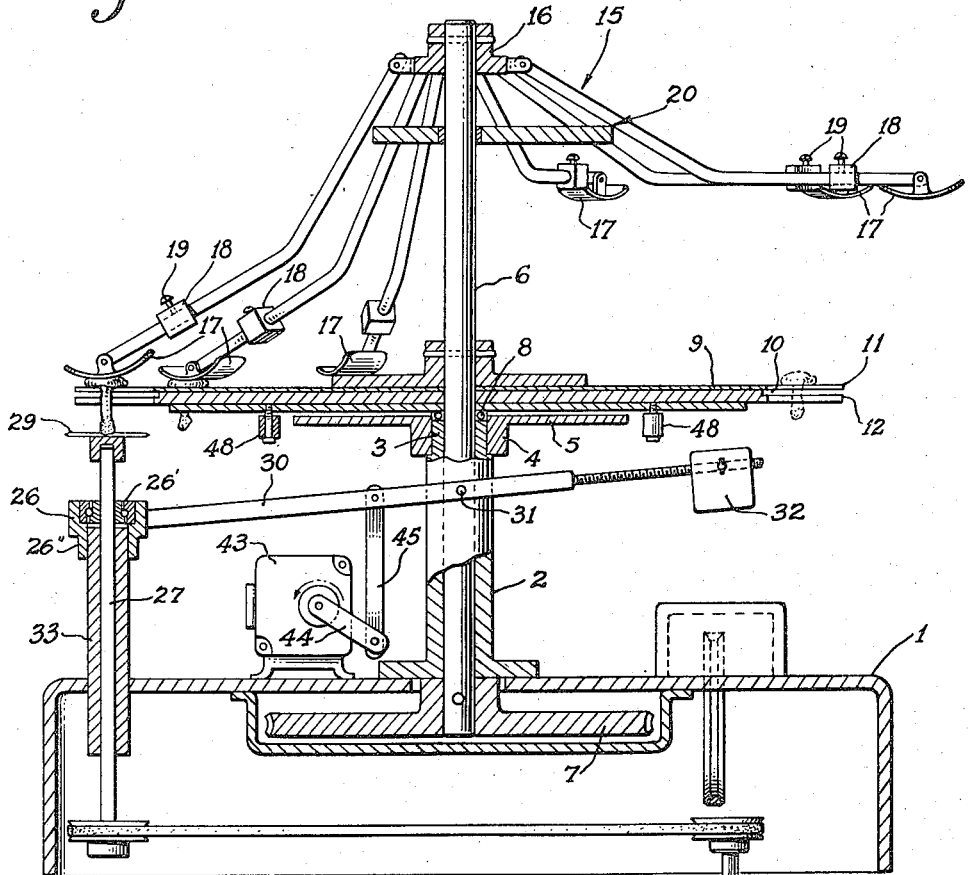
Figure 2 is a central, vertical section through the machine, taken on the line 2—2 of Figure 1.
Figure 4:
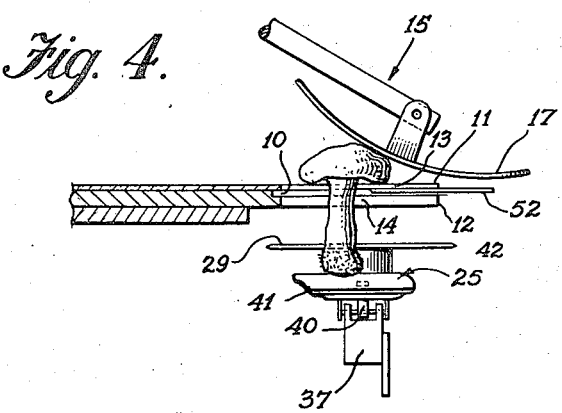
Figure 4 is a section taken on the line 4—4 of Figure 3.

In general, the invention consists in the provision of improved means for automatically adjusting the position of a root cut-off knife in a mushroom trimming machine of the type shown in the above-mentioned Patent No. 2,621,692, which means is controlled, or its motion stopped, by mushrooms on the machine advancing toward cutting position, which means impose no, or very little, strain on pressure forces upon the mushrooms or other commodity being handled.

Referring to the drawings in detail, there is shown a trimming machine of the general type disclosed in Patent No. 2,621,692. The machine is built upon a base 1, which may be supported at desired height upon legs, a suitable bench or frame, etc. Mounted upon the base there is a vertical pedestal 2, upon which the movable parts of the machine are supported. The pedestal is hollow and the upper end of the pedestal is of reduced diameter, as at 3, to receive the hub 4 of a circular plate 5. The hub is fixed to the pedestal to hold plate 5 stationary.

A vertical shaft 6 extends through the hollow pedestal and projects above and below the pedestal. The bottom end of the shaft may carry a gear 7 and be rotated by suitable drive mechanism, such as shown in the above-mentioned prior patent.

On top of the pedestal 2 there is a thrust bearing 8, upon which rests an article carrier 9. The article carrier is shown as circular and composed of several disks secured together. The important feature, however, is that the carrier have a perimetral recess 10 so that the edges of the carrier have upper and lower vertically separated members 11 and 12. These edge members have identical and overlying article-receiving notches 13 and 14. The notches are equally spaced apart around the carrier, twelve being shown. The notches are V-shaped so that they may frictionally engage the stems of mushrooms inserted into them. The mushrooms are adapted to be inserted into the notches with the buttons in contact with the top surface of the carrier.

Although the stems are frictionally, or wedgingly, engaged in the notches, positioning arms 15 are provided to press the mushroom button into contact with the carrier if it was not so placed by the operator and to prevent upward movement of the mushrooms in the event pressure should be exerted from below. One arm is provided for each article-receiving position, and each is pivotally attached to a hub 16 fixed to the top of shaft 6. Thus, the arms will rotate with the carrier and remain in the vertical planes of the article-receiving notches. Each arm carries a curved plate 17 pivotally attached to its lower end to actually rest upon the mushroom buttons to hold them against rising. Adjustable weights 18 are slidable along the arms to regulate the weight to be imposed upon the mushrooms. The weights are provided with set screws 19 by which they are held in positions of adjustment.

It will be understood that the arms will rest upon the mushrooms from the time the mushrooms are placed in the notches until the carrier has rotated through the arc of movement necessary to carry the mushroom through the various cutter positions. The arms will be raised during the remainder of the carrier cycle to permit removal of the stems and loading of additional mushrooms. The position of the arms is controlled by a cam 20, which fits about the shaft 6 and is held against rotation. Immediately after a mushroom is loaded into a notch the arm associated with that notch will move onto the incline 21 of cam 20. This will lower the arm and permit it to rest on the mushroom button. The low arc 22 of the cam will not contact an arm resting upon a mushroom, but will allow the weight of the arm to be imposed upon the product. After the product has been moved through the various cutting stations, the arm will come into contact with the cam incline 23 which will cause the arm to lift and be held in raised position by the high arc 24 during expelling the cut stem and reloading.

As a mushroom in a notch in the carrier leaves its loading position, it will be moved toward a gauge plate 25, mounted upon a collar 26 carried by a vertically movable shaft 27. Shaft 27 is driven from a suitable source of power, such as the motor 28, and carries a circular root-cutting knife 29 at its top. Shaft 27 is rotatably mounted within the collar 26 by means of an anti-friction bearing 26' having its inner raceway fixed to the shaft. The collar is supported upon a lever 30, pivotally mounted, as at 31, on the pedestal 2. Rocking movement of the lever will raise and lower shaft 27 and consequently knife 29. The collar and shaft may be suitably counterbalanced by means of a weight 32, mounted for adjustable movement along the end of lever 30. Shaft 27 is guided in its vertical movement by means of an elongated sleeve 33 which is secured to the base of the machine. Collar 26 has a depending skirt 26" which fits telescopically over the upper end of sleeve 33. This arrangement will hold the shaft in vertical position and confine its bodily movement to an axial direction.

Referring again to the gauge plate 25, it will be observed from Figure 3 in particular that it is mounted by means of a bracket 34 which is attached to the collar 26. It will be noted that the bolts 35 which secure the bracket to the collar pass through slots 36 in the bracket to permit vertical adjustment of the bracket relative to the collar. This, in turn, will serve to adjust the position of the gauge 25 relative to the root knife 29. A micro-switch 37 is mounted on bracket 34, and gauge plate 25 is pivotally connected to the micro-switch as at 38. The micro-switch is of the type which makes contact to close one circuit when its actuating button 39 is depressed and makes contact to close another circuit when pressure is removed from the actuating button. Gauge plate 25 is provided with a brace member 40 which overlies the button 39. It will be understood that the gauge plate assembly, that is the gauge plate and its brace, are sufficiently light so that the micro-switch will not be operated under normal circumstances but only when the gauge plate is rocked about its pivot. The forward end of the gauge plate is downwardly curved, as at 41, to prevent any possible contact of the mushroom with the front edge of the plate. The major portion 42 of the plate, however, is flat and normally lies in a horizontal plane.

The shaft 27 and the root knife 29 are caused to move vertically by a reversible motor 43 which, through crank 44 and link 45, is connected to the lever 30 which supports the root knife. The knife begins its cycle of movement at its lowest position. The motor operates to move the knife vertically upward at the same time that the carrier is rotating to move one of the mushroom-supporting notches toward the path of vertical knife movement. Thus, as the knife starts upwardly a mushroom is being moved toward cutting position. The gauge plate 25 is fixed to the shaft 27 so that it occupies a position underlying the mushroom path of travel on the side from which the mushroom approaches the knife. Due to this arrangement, the mushroom must traverse the length of the plate before it can reach the knife. The knife and carrier are so timed that the knife will reach its upward limit of travel before the mushroom reaches the knife unless its movement is interrupted. This structural arrangement will cause the gauge plate to contact the bottom end of the stem of the mushroom held in the supporting notches prior to the time that the knife reaches its upper limit. Due to the right angular position of the respective paths of travel of the mushroom and knife, contact will be made between the plate and the mushroom and at various points along the length of the plate, depending upon the length of the mushroom stem. Long stems will make contact near the leading end 41 of the plate while shorter stemmed mushrooms will be contacted at positions further along the plate. When the plate contacts the mushroom end the micro-switch 37 will be actuated to stop the motor and thus stop the upward travel of the knife. It will be obvious that contact will be made with long stemmed mushrooms earlier than with short stemmed mushrooms and, therefore, the upward travel of the knife will be stopped sooner if a long stemmed mushroom is approaching the knife. As the motor and circuit which controls it are such that there will be no over-running, cessation of upward knife travel will be instantaneous and the gauge will serve to accurately measure the stem length with little pressure being exerted upon the stem.

It is necessary that the knife be held stationary during the time that the mushroom is cut and until the severed parts have cleared the knife. The contact with the gauge plate will not cover this entire period and, therefore, a second micro-switch 46 is mounted upon the fixed plate 5 beneath the carrier 9. This micro-switch has an arm 47 pivotally connected to it and the arm is provided with a cam face for contact with a plurality of studs 48 depending from the carrier 9. The studs and notches 13 and 14 in the carrier are in radial alignment. Thus, it is a simple procedure to properly position the micro-switch for operation when a mushroom reaches a certain position relative to the gauge plate. The cam face 49 of the arm 47 is so designed that it will contact the stud, at the time indicated above, to depress the micro-switch operating button, and to release it as soon as the root has been severed from the mushroom and the stem has passed beyond the root knife. Switch 46 is also of the type which closes circuits in both of its positions.

A third micro-switch 50 is used, and it also is mounted upon the plate 5. It is provided with an actuating arm 51 positioned for contact by the studs 48. Arm 51 is contacted by a stud to depress the operating button of switch 50 as soon as the stem has moved from the root-cutting knife 29. This establishes a circuit through motor 43 to operate the motor in a reverse direction and bring knife 29 back to its starting point.

After the mushroom leaves the root-cutting knife it is carried to a position where it contacts fixed knife 52 which is arranged within the peripheral recess in the carrier 9 and diagonally across the path of travel of the mushroom stem. The knife is supported upon a bracket 53 from the base 1. This knife acts to cut through the stem just beneath the button.

As the carrier continues its rotative movement the hold-down arm above the mushroom which has just been trimmed will be raised and the button is free for removal. Continued rotation of the carrier will cause the stem to come into contact with an inclined ejector arm 54, also positioned within the peripheral recess in the carrier and supported from the base. This will cause the stem to be loosened in the notch and fall free. An additional mushroom may then be inserted in a notch and the cycle will be repeated.

Figure 5:
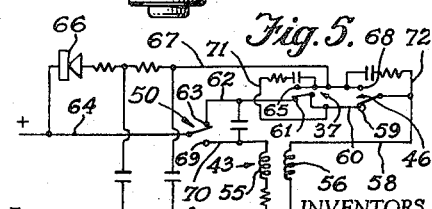
Figure 5 is a wiring diagram showing the motor for adjusting the root knife, the various switches controlling the motor and their electrical connections with one another.

The three switches 37, 46 and 50 may be connected to the motor 43 in any desired manner. By way of example a circuit has been shown in Figure 5. The motor has been illustrated as having two reversely wound coils 55 and 56. These coils are both connected to one side of the line 57. Coil 56 which serves to operate the motor to raise the knife is connected by a wire 58 to the central pole of the switch 46. The normally closed contact 59 of switch 46 is connected by a line 60 to the central pole of switch 37. Normally closed contact 61 of switch 37 is connected by means of wire 62 to the normally closed contact 63 of the switch 50. The central pole of switch 50 is connected to the opposite line 64. Thus, when all of the switches are in the position shown in the diagram, alternating current will be supplied to coil 56 and the motor will operate to raise the root-cutting knife. As the knife moves upwardly the gauge plate will make contact with the end of a mushroom stem as described and switch 37 will be actuated to open the circuit to stop the motor. At the same time, it will close a circuit through the normally open contact 65 which will throw direct current onto the motor to act as a brake in a manner well understood in the art. The direct current is supplied by means of a rectifier 66 bridged across from line 64 to the switch 37 by means of wire 67.

Shortly after switch 37 is actuated, continued operation of the carrier will cause actuation of switch 46. This will cause the switch to open at contact 59 and close at contact 68. It will be observed that switches 46 and 37 are connected into the circuit in exactly the same manner and either one can be used as the positioning switch or the holding switch. Continued operation of the carrier will cause movement of switch 50 so that the circuit through contact 63 will be broken and a circuit through the normally open contact 69 will be closed. This will complete a circuit from line 57 through coil 55, line 70, switch 50, to line 64, to energize coil 55 and operate the motor in a reverse direction.

The circuit may include condensers across the various switches to prevent arcing and condensers and resistors may be used across the direct current line to smooth out the delivery of the current. In addition, bridge circuits 71 and 72 may be used across the switches 37 and 46 to permit some leakage of direct current at all times so that upon elimination of the alternating current by switch operation, direct current will be present for instant stopping of the motor.

It will be obvious that the improved mechanism disclosed herein will provide very accurate control of the root knife with substantially no force being exerted upon the mushrooms. Thus, there will be little or no damage done to the mushroom and, due to the precision with which the device may be actuated, the mushrooms will be precisely trimmed without waste.

As the operation of the device was described step-by-step in connection with the description of the structure a repetition is not believed necessary.

While in the above one practical embodiment of the invention has been disclosed, it will be understood that the precise structure described and shown is merely by way of illustration and the invention may take other forms within the scope of the appended claims.

What is claimed is:

1. In a mushroom trimming machine, a carrier having means to hold a mushroom and operable to transport it along a predetermined path, a knife mounted for bodily vertical movement along a path at right angles to and intersecting said mushroom path, said mushroom supporting means adapted to hold a mushroom with its stem transversely to the knife edge and parallel to the path of knife bodily movement, a motor operatively connected to said knife to bodily raise said knife, and means movable with said knife and fixed relative thereto and operable by contact with the bottom end of a mushroom in said supporting means to stop said motor and bodily movement of said knife.

2. In a machine for trimming mushrooms as claimed in claim 1, means to hold said knife in stopped position until said mushroom supporting means moves beyond the knife path.

3. In a machine for trimming mushrooms as claimed in claim 2, means to reverse said motor to move said knife downwardly after said holding means becomes inoperative.

4. In a machine for trimming mushrooms as claimed in claim 1, means to reverse said motor to move said knife downwardly after said mushroom supporting means has moved beyond said knife path.

5. In a machine for trimming mushrooms as claimed in claim 1, means mounted above said carrier to rest upon the tops of mushrooms on said carrier to hold said mushrooms in position on said carrier.

6. In a machine for trimming mushrooms as claimed in claim 1, hold-down means mounted above said carrier to rest upon the tops of mushrooms on said carrier during the approach of mushrooms to and beyond said knife path, and means to raise said hold-down means after passage of mushrooms beyond said knife path.

7. In a machine for trimming mushrooms as claimed in claim 6, means to vary the weight of said hold-down means imposed upon mushrooms on said carrier.

8. In a machine for trimming mushrooms of the type having a knife mounted for vertical movement and a carrier having means to hold mushrooms and operable to successively carry mushrooms through a path approaching the knife while holding the mushroom stems transversely of the knife cutting edge and parallel to the path of vertical movement of the knife, means to control the movement of said knife comprising, a motor operatively connected to said knife to move the knife vertically toward said mushroom path, a gauge plate mounted for vertical movement with said knife and means actuated by contact of said gauge plate with the end of a mushroom on said carrier to stop operation of said motor.

9. In a machine for trimming mushrooms as claimed in claim 8, means operable by movement of said carrier to hold said motor stopped during an arc of carrier movement sufficient to carry a mushroom from gauge plate contacting position beyond said knife, and means operable by continued movement of said carrier to operate said motor in a reverse direction to return said knife to its original position.

10. In a machine for trimming mushrooms as claimed in claim 8, means to permit adjustment of said gauge plate toward and from said knife.

11. In a machine for trimming mushrooms as claimed in claim 8, a second knife across the path of mushroom movement and fixed with respect thereto.

12. In a machine for trimming mushrooms as claimed in claim 8, said gauge plate being adjustable toward and from said knife, and a second knife across the path of mushroom movement and fixed with respect thereto.

References Cited in the file of this patent

UNITED STATES PATENTS

| 2,565,727 | Henderson | Aug. 28, 1951 |
| 2,621,692 | Urschel et al. | Dec. 16, 1952 |

FOREIGN PATENTS

| 476,045 | Italy | Nov. 26, 1952 |